US010789690B2

(12) United States Patent
Duggal et al.

(10) Patent No.: US 10,789,690 B2
(45) Date of Patent: Sep. 29, 2020

(54) MASKING NON-PUBLIC CONTENT (71) Applicant: Adobe Inc.

(72) Inventors: Ashish Duggal, New Delhi (IN);
Sachin Soni, New Delhi (IN);
Himanshu Mittal, New Delhi (IN);
Amit Srivastava, Noida (IN)

(73) Assignee: ADOBE INC., San Jose, CA (US)

( * ) Notice: Subject to any disclaimer, the term of this patent is extended or adjusted under 35 U.S.C. 154(b) by 237 days.

(21) Appl. No.: 15/914,809

(22) Filed: Mar. 7, 2018

(65) Prior Publication Data
US 2019/0279344 A1 Sep. 12, 2019

(51) Int. Cl.
| | | |
|---|---|---|
| *G06T 9/00* | (2006.01) | |
| *G06T 5/20* | (2006.01) | |
| *G06K 9/62* | (2006.01) | |
| *G06F 21/62* | (2013.01) | |
| *G06F 3/02* | (2006.01) | |

(52) U.S. Cl.
CPC ............... *G06T 5/20* (2013.01); *G06F 3/02* (2013.01); *G06F 21/6254* (2013.01); *G06K 9/6254* (2013.01); *G06K 9/6269* (2013.01)

(58) Field of Classification Search
CPC ......... G06T 5/20; G06F 3/02; G06F 21/6254; G06K 9/9254; G06K 9/6269
See application file for complete search history.

(56) References Cited

U.S. PATENT DOCUMENTS

| | | | | |
|---|---|---|---|---|
| 9,400,806 | B2* | 7/2016 | Ramachandrula | .... G06F 16/583 |
| 10,402,689 | B1* | 9/2019 | Bogdanovych | ......... G06T 7/194 |
| 10,565,729 | B2* | 2/2020 | Vajda | ................... G06K 9/6256 |
| 2013/0108105 | A1* | 5/2013 | Yoo | ........................ H04N 5/275 |
| | | | | 382/103 |
| 2017/0061258 | A1* | 3/2017 | Chen | ........................ G06N 3/08 |
| 2019/0279344 | A1* | 9/2019 | Duggal | ................... G06F 21/84 |
| 2020/0181080 | A1* | 6/2020 | Shin | ..................... C07D 207/36 |

OTHER PUBLICATIONS

Ren, Shaoqing, et al., "Faster R-CNN: Towards Real-Time Object Detection with Region Proposal Networks", arXiv:1506.01497v3, Jan. 6, 2016, 14 pages.
Yuan, Peng, et al., "Faster R-CNN with Region Proposal Refinement", Stanford University, CS231n: Convolutional Neural Networks for Visual Recognition Project, Jun. 2017, 7 pages.
Girschick, Ross, et al., "Rich feature hierarchies for accurate object detection and semantic segmentation", arXiv:1311.2524v5, Oct. 22, 2014, 21 pages.
Girschick, Ross, et al., "Fast R-CNN", arXiv: 1504.08083v2, Sep. 27, 2015, 9 pages.

\* cited by examiner

*Primary Examiner* — Gregory M Desire (57) ABSTRACT

Systems and techniques for masking non-public content in screen images are provided. An example system includes a screen capture tool, a region-based object detection system, a classifier, and an image masking engine. The screen capture tool may be configured to generate a screen image representing a screen being displayed by the system. The region-based object detection system may be configured to identify multiple regions within the screen image as potential non-public content regions. The classifier may be configured to selectively classify the identified regions as non-public content regions. The image masking engine may be configured to generate a masked image by masking the regions classified as non-public content regions in the screen image.

20 Claims, 10 Drawing Sheets

MASKING NON-PUBLIC CONTENT

BACKGROUND

Various types of non-public content that are displayed on a screen of a computing device may be inadvertently shared. For example, while a user is presenting a document in a screen sharing session, an e-mail notification may be shown. As another example, a user's web history or frequently visited sites list may be inadvertently shown when a web browser is used in a screen sharing session. Similarly, a file explorer may show a history of recently accessed files on a user's computer. Each of these situations may inadvertently share private data.

Conventional solutions attempt to prevent inadvertent sharing by providing user controls to allow a user to select what will be shared. For example, a user may choose to share a document, application, or whiteboard rather than the screen. If the user chooses one of these options, inadvertent disclosures may be prevented at least some of the time. However, these options are often less convenient than screen sharing. For example, when a user wants to share multiple documents or applications, the user may need to repeatedly select a different application or document to share. This can become tedious and lead to mistakes (e.g., forgetting to share to a document or application) when the user is switching back and forth between documents or applications frequently.

Additionally, sharing an application may not always prevent inadvertent disclosure of certain types of non-public content. For example, some applications include lists of recent or frequently accessed sites or documents. Sharing one of these documents or applications may lead to inadvertent disclosure of this non-public information even when a user chooses to share just an application.

Neural networks may be applied to image processing tasks. In general, neural networks, especially deep neural networks have been very successful in modeling high-level abstractions in data. Neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. The mapping occurs via the function. Thus, the weights are weights for the mapping function of the neural network.

Each neural network is trained for a specific task, e.g., image processing, prediction, classification, encoding, etc. The task performed by the neural network is determined by the inputs provided, the mapping function, and the desired output. Training can either be supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task it was trained for.

In a neural network, the neurons are organized into layers. A neuron in an input layer receives the input from an external source. A neuron in a hidden layer receives input from one or more neurons in a previous layer and provides output to one or more neurons in a subsequent layer. A neuron in an output layer provides the output value. What the output value represents depends on what task the network is trained to perform. Some neural networks predict a value given the input. Some neural networks provide a classification given the input. When the nodes of a neural network provide their output to every node in the next layer, the neural network is said to be fully connected. When the neurons of a neural network provide their output to only some of the neurons in the next layer, the network is said to be convolutional. In general, the number of hidden layers in a neural network varies between one and the number of inputs.

To provide the output given the input, the neural network must be trained, which involves learning the proper value for a large number (e.g., millions) of parameters for the mapping function. The parameters are also commonly referred to as weights as they are used to weight terms in the mapping function. This training is an iterative process, with the values of the weights being adjusted over thousands of rounds of training to arrive at highly accurate values. In the context of neural networks, the parameters are initialized, often with random values, and a training optimizer iteratively updates the parameters, also referred to as weights, of the network to reduce error in the mapping function. In other words, during each round, or step, of iterative training the network updates the values of the parameters so that the values of the parameters eventually converge on the optimal values.

SUMMARY

A general aspect is a system for masking screen images. An example system includes at least one memory including instructions and at least one processor that is operably coupled to the at least one memory and that is arranged and configured to execute instructions that, when executed, cause the at least one processor to implement an application. The application includes a screen capture tool, a region-based object detection system, a classifier, and an image masking engine. The screen capture tool may be configured to generate a screen image representing a screen being displayed by the system. The region-based object detection system may be configured to identify multiple regions within the screen image as potential non-public content regions. The classifier may be configured to selectively classify the identified regions as non-public content regions. The image masking engine may be configured to generate a masked image by masking the regions classified as non-public content regions in the screen image.

Another general aspect is a computer-implemented method for masking a screen image. An example method includes receiving a screen image representing a screen being displayed by a sharing computing device and identifying potential non-public content regions within the screen image. The method also includes selectively classifying the potential non-public content regions as non-public content regions and generating a masked screen image from the screen image based on overlaying a mask on the non-public content regions. The method also includes transmitting the masked screen image to a viewer computing device.

Another general aspect is a computer-implemented method for training a system to generate masks for non-public information. The method includes receiving example screen images and compositing non-public content on the example screen images to generate training non-public screen images and corresponding reference mask data. The method also includes identifying regions for masking within the training non-public screen images using a non-public content masking system. The method also includes, based on comparisons of the identified regions to the reference mask data, training the non-public content masking system to identify regions containing non-public content for input images.

The details of one or more implementations are set forth in the accompanying drawings and the description below. Other features will be apparent from the description and drawings, and from the claims.

BRIEF DESCRIPTION OF THE DRAWINGS

FIG. 3b is a schematic diagram of an example masked screen image that corresponds to the example input screen image of FIG. 3a.

FIG. 4b is a schematic diagram of an example masked screen image that corresponds to the example input screen image of FIG. 4a.

FIG. 5b is a schematic diagram of an example masked screen image that corresponds to the example input screen image of FIG. 5a.

FIG. 6b is a schematic diagram of an example masked screen image that corresponds to the example input screen image of FIG. 6a.

DETAILED DESCRIPTION

This description relates to masking non-public content, for example, to prevent inadvertent disclosure of the non-public content during a screen sharing activity. In some implementations, non-public content is masked using a neural network. The neural network may identify regions of non-public content within a screen image that will be shared in real-time. The identified non-public regions may then be used to generate a masked image by overlaying masks (e.g., a solid color) on the original screen image. The masked image is then shared rather than the original screen image.

Example screen sharing activities may include a presentation on a projector or over a network using a screen sharing application or a video recording captured using a screen capture application. Other examples of screen sharing activities may include any other activity in which the content of a user's screen is intentionally or unintentionally visible to others.

Conventional screen sharing may lead to inadvertent disclosure of various types of non-public content. The non-public content may include private, confidential, or user-specific information. The non-public content may also include information that a user has simply not chosen to share even if the information is not private, confidential, or user-specific. In this case, the inadvertent disclosure of the non-public content could be distracting.

The systems and technologies described herein identify regions of non-public content in screen images using a content masking system that includes a region-based object detection system and a classifier. The region-based object detection system can identify regions in an input screen image that potentially include non-public content. The region-based object detection system can also extract features of the image content of the identified regions. The region-based object detection system may also generate output parameters for the identified regions based, for example, on the extracted features. The output parameters may include labels, scores, or other types of parameters that may be based on the image content of the associated region. For example, the output parameters may be based on detecting objects within the image content.

In some implementations, the region-based object detection system includes a faster regional convolutional neural network that generates region proposals and output parameters for those regions. For example, the region-based object detection system may include a deep convolutional network in which one or more of the layers are shared by a region proposal network and an object classifier network. The object classifier may perform object detection within regions generated by the region proposal network and may generate output parameters that correspond to detected objects (e.g., labels, scores). Because the layers are shared and used to perform both the generation of the region proposals and the generation of the output parameters for those regions, the same neural network calculations can be used for both purposes. This reuse of calculations means that fewer calculations or processor cycles are needed than if the networks were separate and, accordingly, the non-public content regions of the input screen images can be identified more rapidly. The regions proposals may be combined with the output of layers of the convolutional network using region of interest pooling (RoiPool). In some implementations, the region-based object detection system identifies non-public content regions in input screen images rapidly enough to allow for real-time masking of non-public content during a screen sharing session.

In some implementations, a classifier classifies the regions proposed by the region-based object detection system based, for example, on the output parameters generated by the region-based object detection system. For example, labels generated by the region-based object detection system may be used by a support vector machine to classify proposed regions as including non-public content based on labels or other output parameters generated by the region-based object detection system. Once regions are identified as including non-public content, the identified regions are masked before the screen image is shared. Masking the region may include overlaying an opaque shape over or applying a filter (e.g., a blur) to the regions identified as including non-public content. In this manner, the non-public content is not inadvertently disclosed. In contrast to conventional screen sharing systems, the systems and techniques described herein may prevent inadvertent disclosure of non-public content regardless of the screen sharing mode selected and even when the non-public content is displayed within a shared application. The systems and techniques described herein may also be applied to other screen sharing activities that could lead to inadvertent disclosure of non-public information. For example, screen sharing activities may include using a screen capture tool to generate video or still images, using a projector, or using a device in a public space where the screen may be viewed by others.

As used herein, non-public content is content that a user has not chosen to share. The non-public content may include private, confidential, or user-specific information. The non-public content may also include information that is not private, confidential, or user-specific, but that the user has not intentionally chosen to share. For example, the non-public content can include various types of pop-up notifications or alerts that may appear on a screen at various times. These alerts or notifications may, but do not necessarily, include personal or confidential information. However, when sharing a screen, a user does not typically intentionally choose to share alerts and notifications. Similarly, a user typically does not intentionally choose to share a favorites list or auto-complete suggestions. Because a user does not intentionally choose to share these types of content (and typically does not desire to share these types of content), they are example of non-public content.

As used herein, neural networks refer to computational models used in machine learning and made up of nodes organized in layers with weighted connections. In some implementations, the nodes of a layer are represented as a matrix of values for the layer. The values for each layer may be calculated based on the values of the previous layer and the weighted connections. A layer in a neural network may be fully-connected to the previous layer (e.g., each value in the layer is a calculated as an independently adjusted weighted combination of each value in the previous layer). Training a neural network uses training examples, each example being an input and a desired output, to determine, over a series of iterative rounds, optimal weight values for the connections between layers that result in the neural network providing the desired output given the input. During each round, the weights are adjusted to address incorrect output. Once trained, the neural network can be used to predict an output based on provided input.

As used herein, a convolutional neural network (CNN) is a neural network in which at least one of the layers of the neural network is a convolutional layer. A convolutional layer is a layer in which the values of a layer are calculated based on applying a kernel function to a subset of the values of a previous layer. Training the neural network may involve adjusting weights of the kernel function based on the training examples. Typically, the same kernel function is used to calculate each value in a convolutional layer. Accordingly, there are far fewer weights that must be learned while training a convolutional layer than a fully-connected layer (e.g., a layer in which each value in a layer is a calculated as an independently adjusted weighted combination of each value in the previous layer) in a neural network. Because there are typically fewer weights in the convolutional layer, training and using a convolutional layer may require less memory, processor cycles, and time than would an equivalent fully-connected layer.

As used herein, a faster regional convolutional neural network (faster rCNN) is a convolutional neural network that proposes regions for an input image and classifies objects within the proposed regions. The faster rCNN generates region proposals based on values of an intermediate neural network layer with the convolutional neural network. The faster rCNN includes additional neural network layers that classify the proposed regions based on the corresponding values in the intermediate neural network layer of the convolutional neural network.

Figure 1:
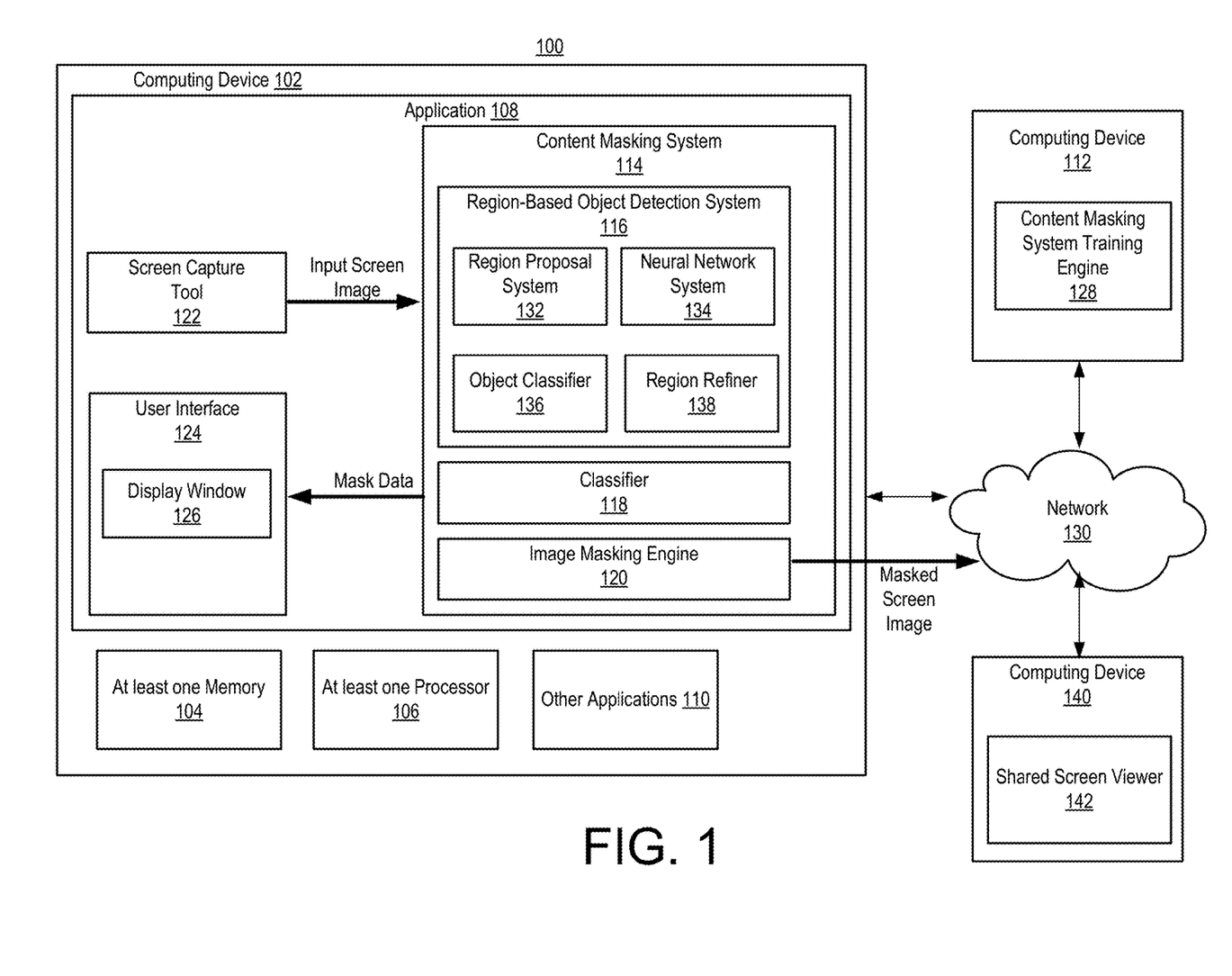
FIG. 1 is a block diagram of a system for masking non-public content.

FIG. 1 is a block diagram of a system 100 for masking non-public content. The system 100 includes a computing device 102 having at least one memory 104, at least one processor 106, an application 108, and other applications 110. The computing device 102 may communicate with one or more other computing devices over a network 130. For instance, the computing device 102 may communicate with a computing device 112 or a computing device 140 over the network 130. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. Additionally, the at least one processor may include one or more central processing units (CPUs) and/or one or more graphics processing units (GPUs). In some implementations, the at least one memory 104 includes a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the images or other types of data generated by the application 108 and components used by the application 108.

The network 130 may be implemented as the Internet, but may assume other different configurations. For example, the network 130 may include a wide area network (WAN), a local area network (LAN), a wireless network, an intranet, combinations of these networks, and other networks. Of course, although the network 130 is illustrated as a single network, the network 130 may be implemented as including multiple different networks.

The application 108 may be accessed directly by a user of the computing device 102. In other implementations, the application 108 may be running on the computing device 102 as a component of a cloud network where a user accesses the application 108 from another computing device over a network, such as the network 130. In one implementation, the application 108 may be a screen sharing application or application that includes features and functionality to enable screen sharing. The image screen sharing application may be a standalone application that runs on the computing device 102. Alternatively, the screen sharing application may be an application that runs in another application such as a browser application. The screen sharing application enables a user to share at least a portion of the content generated for display on a screen of the computing device 102. As another example, the application 108 may be a screen capture application that captures content generated for display on a screen of the computing device 102 to generate images or videos that may then be shared.

The application 108 masks input screen images to generate masked screen images. The masks prevent inadvertent disclosure of non-public information by occluding regions of the input screen image that are identified as including non-public information. Masking the input screen image may include identifying regions of the input image screen image that may include non-public information and replacing the identified region with a solid color, blurring the identified region, or otherwise obscuring the identified region. The non-public information may include private or confidential information. The non-public information may also include information the user has not decided to share publicly regardless of whether the information is private or confidential.

The application 108 includes a content masking system 114 that is configured to mask content of screen images. The content masking system 114 may include a region-based object detection system 116, a classifier 118, and an image masking engine 120.

The region-based object detection system 116 may identify regions of content within the input image. The identified regions may be regions that potentially include non-public information. The region-based object detection system 116 may also extract features of the identified regions and/or generate output parameters based on the extracted features. The output parameters may include labels, scores, or properties that are based on the image data of the region or the features extracted from the image data of the region. These output parameters may be used for classifying the identified regions to determine whether the region of the input image should be masked. The input image may be any type of image that represents a screen or a portion of a screen that could be displayed by the computing device 102.

The object detection system 116 may include a region proposal system 132, a neural network system 134, an object classifier 136, and a region refiner 138. Although the region proposal system 132, neural network system 134, object classifier 136, and region refiner 138 are described separately herein, these components may be combined or may share resources. For example, the object detection system 116 may implement a faster regional convolutional neural network, in which a single convolutional neural network is used to performs both region proposal and output parameter generation (e.g., based on object detection or classification). In some implementations, the region proposal and output parameter generation are performed by networks that share one or more convolutional layers.

The region proposal system 132 proposes regions in the input image based, for example, on the content of the image. For example, the region proposal system 132 may evaluate the input image using windows of different sizes to identify regions with common colors, texture, edges, intensities, etc. In some implementations, the region proposal system 132 uses values from one or more layers of the neural network system 134 to generate the region proposals. For example, the region proposal system 132 may use values from an intermediate (or hidden) layer of the neural network system 134 to generate proposed regions. The region proposals may be coordinates in the input image or representation of the input image generated by one of the layers of the neural network system 134. The proposed regions may be regions that potentially include an object of some type. In some implementations, the proposed regions are regions that potentially include non-public content.

The neural network system 134 includes one or more neural networks. In some implementations, the one or more neural networks includes a convolutional neural network. The neural networks may be trained to perform classification of objects within the input image. In some implementations, the neural network system 134 includes a faster regional convolutional neural network. The faster convolutional neural network may, for example, include multiple convolutional layers that generate values (or feature maps) for the input image. These feature maps may be used by the region proposal system 132 to generate regions proposals.

As described above with respect to the region proposal system 132, the regions may be generated based on an intermediate (or hidden) layer within the neural network system 134. The neural network system 134 may include additional layers that operate on the proposed regions. In some implementations, the neural network system 134 uses region of interest pooling (RoIPool) to combine the regions proposed by the region proposal system 132 with the values from a layer of the neural network system 134. For example, each region proposal may be mapped to a corresponding portion of a layer in the neural network system 134 (e.g., the layer that was used by the region proposal system 132). Because the regions may have different size, the mapped region proposals may be resized to a common size. For example, larger regions may subsample the corresponding values of a layer of the neural network system 134 (e.g., a region that maps to 64×64 values from the layer to a 16×16 representation by selecting the maximum value from each block of 4×4 values in the portion of the layer corresponding to the region).

The object classifier 136 classifies the images in the regions proposed by the region proposal system 132 using the values generated for the regions by the neural network system 134. Based on the classification, the object classifier 136 may generate output parameters for the image such as labels and scores for at least some of the identified regions. For example, the object classifier 136 may generate labels based on identifying objects within the regions. The object classifier may include a support vector machine (SVM) to classify the region based on the RoiPool-generated representation of the region using output values from the neural network system 134. The object classifier may also include a softmax function. The object classifier 136 may, for example, generate labels and scores for each of the regions. The labels may correspond to the classification of an object in the region and the score may correspond to a certainty associated with that classification. In some implementations, the classifier generates output parameters for an input image (e.g., region coordinates, labels, scores) only when the score exceeds a specific threshold.

The region refiner 138 may refine the regions proposed by the region proposal system 132 based on the object classifier 136. For example, the region refiner may perform linear regression on the coordinates of each of the proposed regions to improve the scores generated by the object classifier 136.

The classifier 118 classifies the regions identified by the region-based object detection system 116. For example, the classifier 118 may selectively classify the regions as non-public content regions. In some implementations, the classifier 118 uses output parameters generated by the region-based object detection system 116 to classify the regions. For example, the classifier 118 may use labels assigned to the identified regions to classify the regions. In some implementations, the classifier 118 includes a support vector machine that classifies the regions. In some implementations, the classifier 118 may use a map based on the labels generated by the object detection system 116 to classify a region as including non-public content. For example, a region labeled as "e-mail notification" may be mapped to a non-public content, while a region labeled "bird" may not be mapped to non-public content. Depending on the input screen image, zero, one, or multiple regions may be classified as non-public content regions.

The image masking engine 120 generates masks for the regions classified by the classifier 118. In some implementations, the image masking engine 120 generates opaque shapes having a solid color that match the shape of the non-public content regions and are overlaid on the input screen image to generate a masked screen image. In some implementations, the image masking engine 120 may blur or generate a partially transparent overlay for the input screen image that obscures the underlying content. The image masking engine 120 may transmit the masked screen image via the network 130 to a shared screen viewer 142 of the computing device 140.

Figure 2:
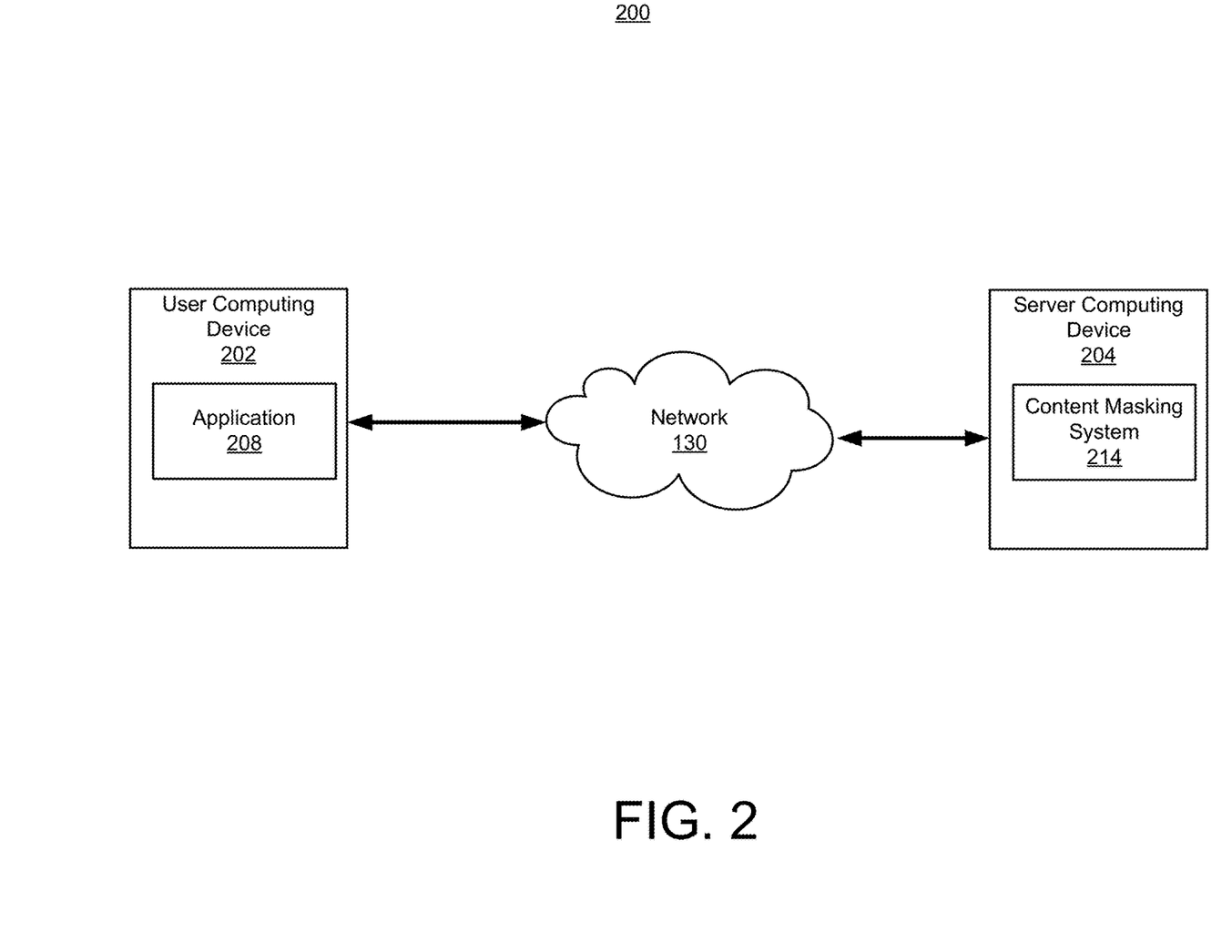
FIG. 2 is a schematic diagram of an embodiment of the system for masking non-public content.

Although in FIG. 1, the content masking system 114 is shown as a component of the application 108, the content masking system can also be separate from the application. For example, FIG. 2 shows an implementation of a system 200 in which a user computing device 202 includes an application 208 that communicates over the network 130 with a content masking system 214 provided by a server computing device 204. For example, the server computing device 204 may provide a content masking service. The user computing device 202 may transmit an input image to the server computing device 204 and receive corresponding masked images back from the content masking system 214. In some implementations, the server computing device 204 may also provide a screen sharing service and may transmit the masked images to other computing devices that are participating in an online meeting with the user computing device 202. The server computing device 204 may transmit mask data back to the user computing device 202, which the user computing device 202 can then use to indicate which region of the input screen image were identified for masking.

Returning now to FIG. 1, the application 108 also includes a screen capture tool 122 and a user interface 124. The screen capture tool 122 captures at least a portion of a screen image that is generated for display by the computing device 102. The portion may include the entire screen, a region of the screen (e.g., a rectangle defined by input from a user), an application, or a document. For example, the screen capture tool 122 may capture a screen buffer that is used by the computing device 102 to control a display device. The screen capture tool 122 may also capture a sequence of images that are used to refresh the screen. The sequence may include key frame screen images and inter frame screen images. The key frame screen images may include complete image data for all of the pixels in the image, while the inter frame screen images may represent a screen image with reference to a preceding screen image (e.g., with reference to a key frame). For example, the inter frame may be represented in terms of differences from the preceding screen image.

The user interface 124 may include a display window 126 in which either the input screen image or the masked screen image is displayed. The user interface 124 may also include user-actuatable controls that can be used to provide feedback or change the way the input screen image is masked. For example, the user interface 124 may include a clear control associated with each region of the input screen image that is being masked. The clear control may be configured to receive a user input indicating that the associated region should not be masked. The mask may then be removed from the associated region. In some implementations, the input screen image is stored for use training the region-based object detection system 116.

The region-based object detection system 116 may first be trained before being incorporated as part of the application 108. For example, the region-based object detection system 116 may include a multi-layer convolutional neural network (CNN) that includes multiple parameters that are adjusted during a training process. For example, in some implementations, the region-based object detection system 116 includes approximately 50 million parameters that have been adjusted during a training process to generate regions and features from the images. In some implementations, the region-based object detection system is a faster regional convolution neural network.

Training the neural network may be time-consuming and use a significant amount of system memory and processing cycles. Additionally, training the neural network may require access to a large corpus of training data. For example, the corpus may include thousands, tens of thousands, or even more training images. In one implementation, the neural network may be trained using a different computing device, such as computing device 112, which includes a content masking system training engine 128. The content masking system training engine 128 may train the region-based object detection system 116 and the classifier 118 based on training data. Training the region-based object detection system 116 may include adjusting values of hundreds, thousands, or millions of parameters of the region-based object detection system 116 so that the region-based object detection system 116 produces outputs on training data that closely matches the expected outputs. Similarly, the content masking system training engine 128 may tune the classifier 118 to optimally classify (e.g., separate the non-public content regions from the other identified regions) the training data using output parameters generated from the training data by the region-based object detection system 116. Tuning the classifier 118 may include identifying a hyperplane on a feature space associated with the features extracted from the training data and/or output parameters generated based on the training data.

Figure 3A:
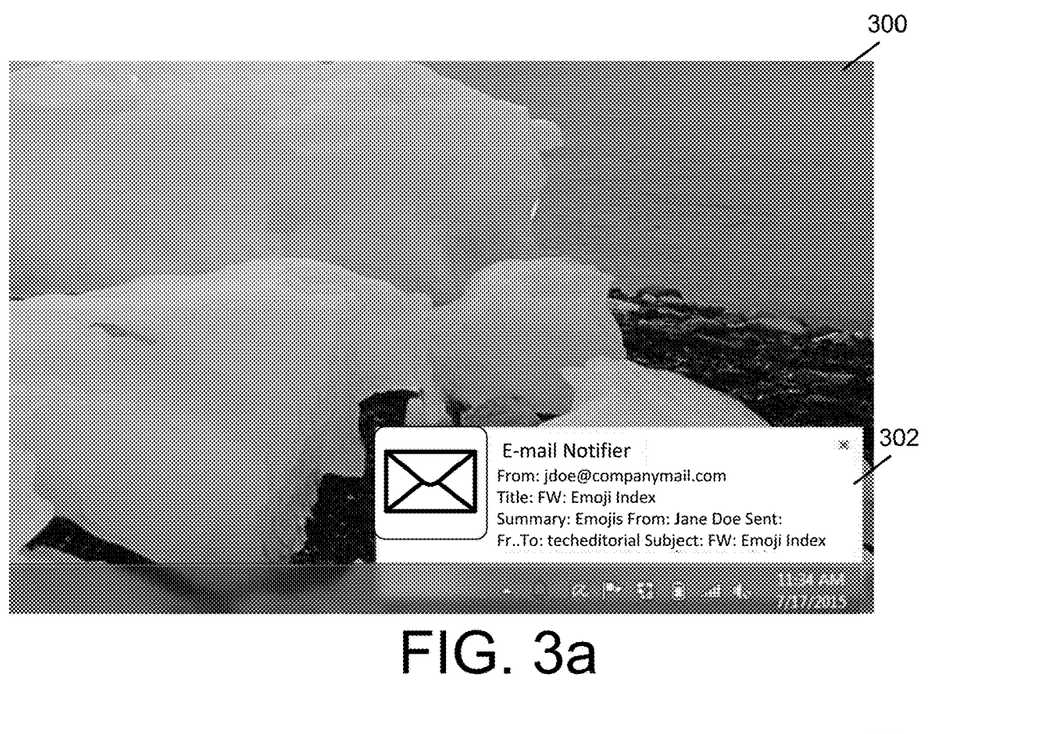
FIG. 3a is a schematic diagram of an example input screen image that includes non-public content.
Figure 3B:
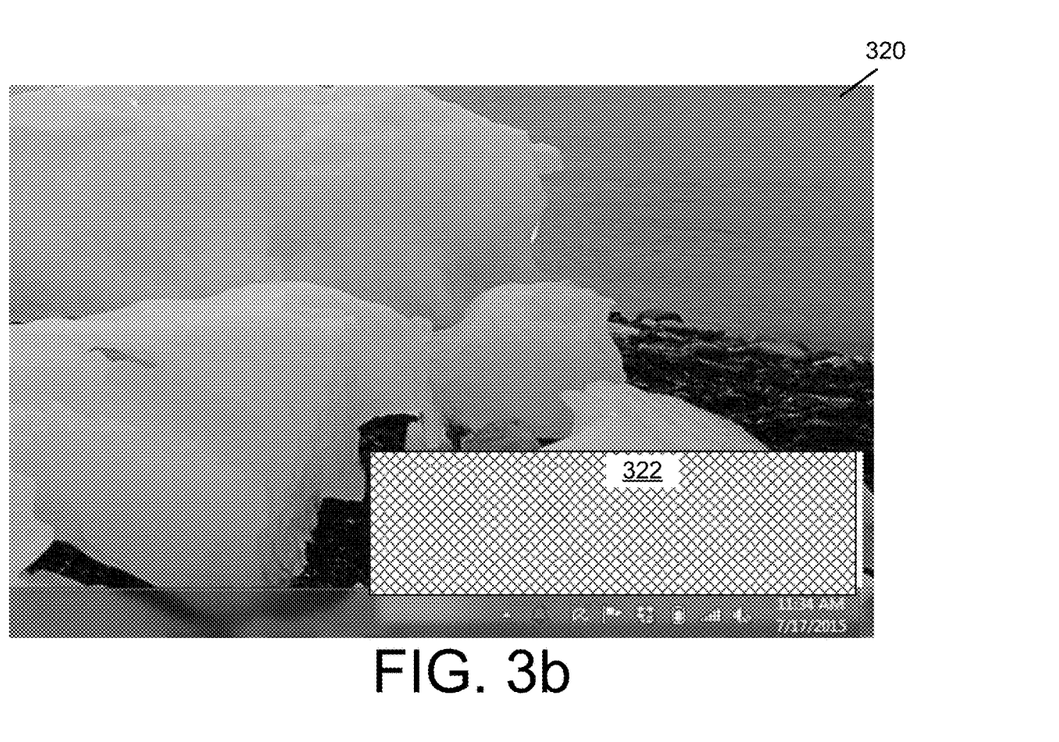

Referring to FIGS. 3a and 3b, an example input screen image 300 and a corresponding masked screen image 320 are shown. The input screen image 300 includes a notification message 302. The notification message 302 is an example of a user interface element that pop-ups over anything else being shown on the screen to alert the user about something. The notification message 302 may be generated by any application to indicate the occurrence of a particular event related to that application. The notification message 302 may be shown for a limited time period and may show all sorts of information. The information shown may or may not be information that a presenter cares about keeping confidential, but generally presenters would prefer not to have the notification message 302 (e.g., if nothing else, the notification message 302 may be distracting). In this example, the notification message 302 was generated by an e-mail application indicates that an e-mail was received. In the masked screen image 320, a mask panel 322 is shown in place of the notification message 302.

Figure 4A:
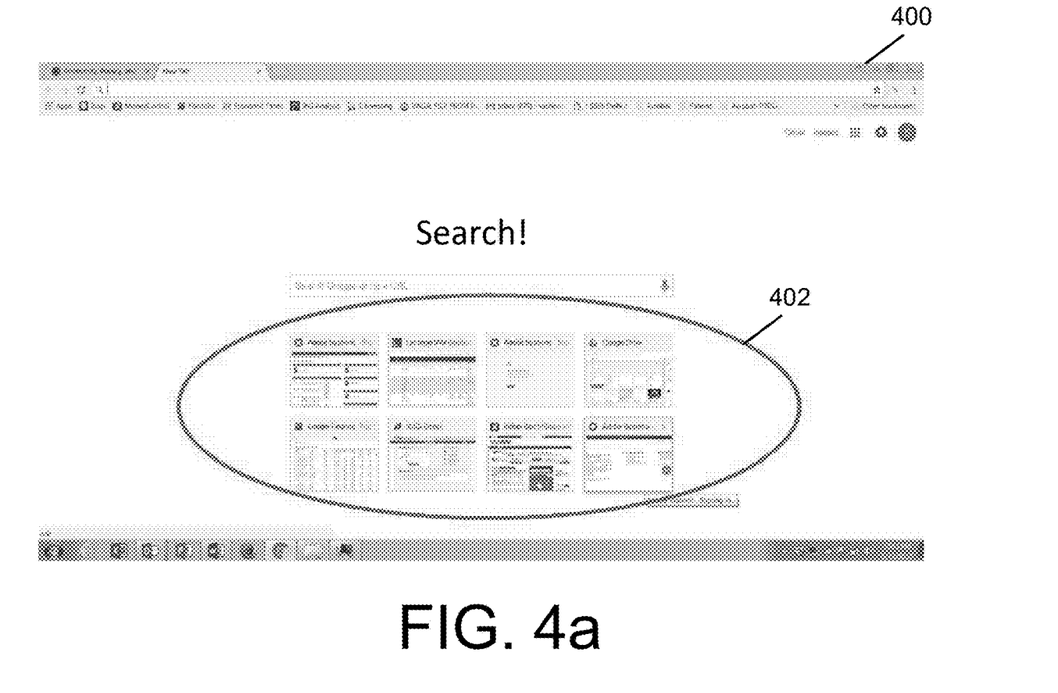
FIG. 4a is a schematic diagram of an example input screen image that includes non-public content.
Figure 4B:
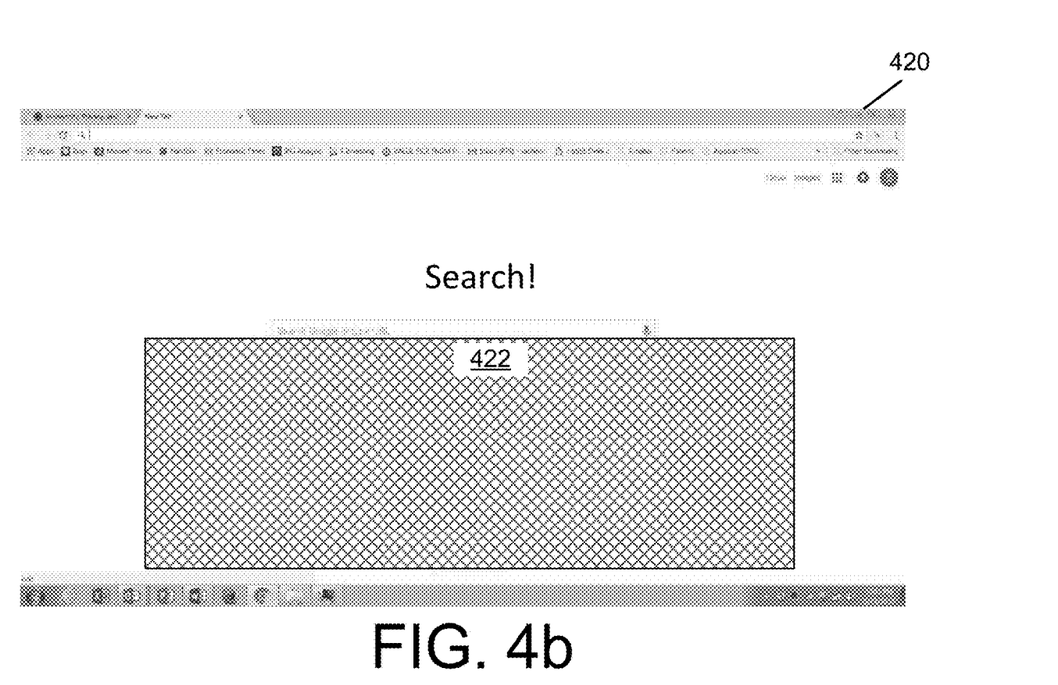

Referring to FIGS. 4a and 4b, an example input screen image 400 and a corresponding masked screen image 420 are shown. The input screen image 400 includes a most-visited panel 402. The most-visited panel 402 may include a list of websites, files, or other types of content or documents that the user accesses most frequently. The entries shown in the most-visited panel 402 may be generated automatically by any type of application based on a user's previous interactions with the application. Typically, most-visited panels are parts of an application and would be shared even if a user elects to share only the application. Displaying the most-visited panel 402 may reveal information the user does not want to reveal. In the masked screen image 420, a mask panel 422 is shown in place of the most-visited panel 402.

Figure 5A:
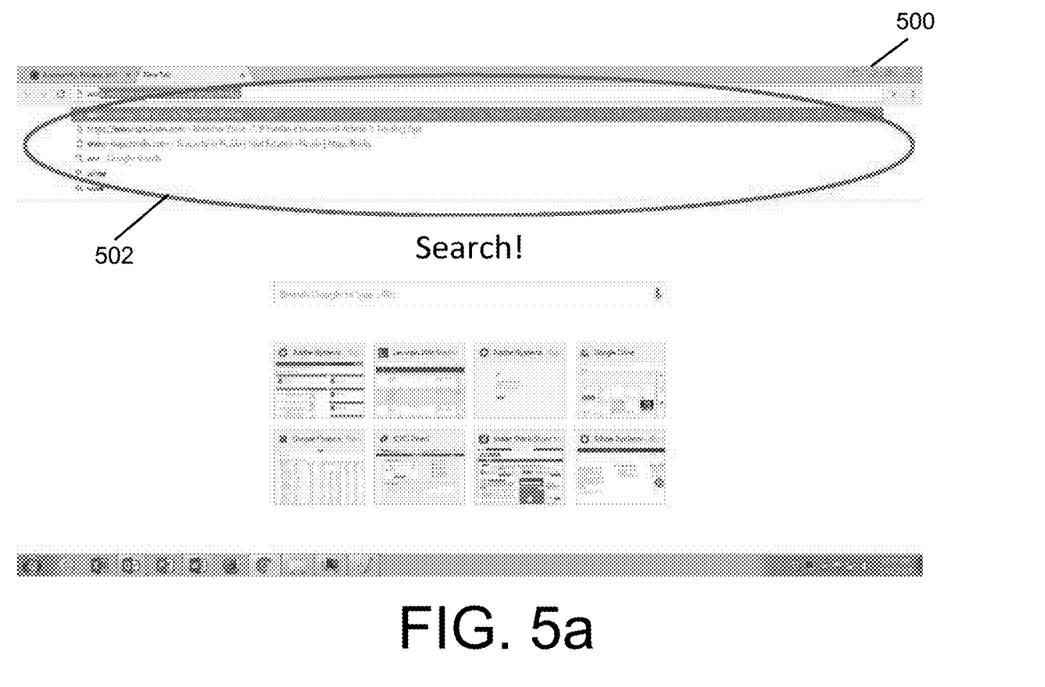
FIG. 5a is a schematic diagram of an example input screen image that includes non-public content.
Figure 5B:
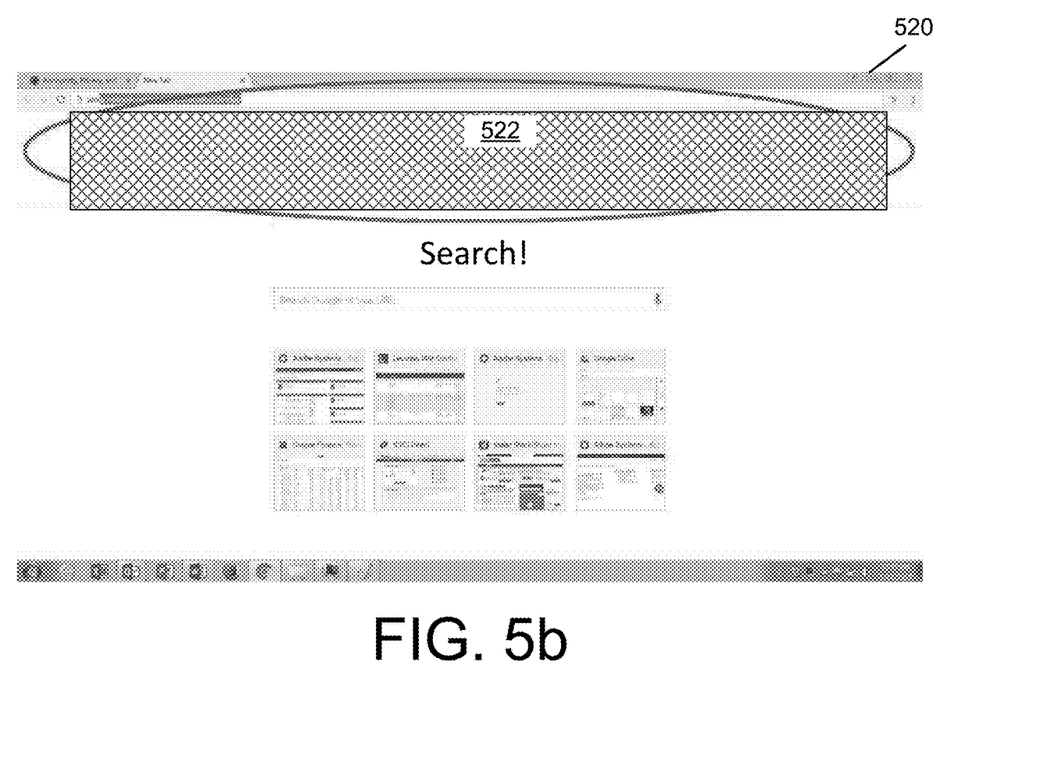

Referring to FIGS. 5a and 5b, an example input screen image 500 and a corresponding masked screen image 520 are shown. The input screen image 500 includes an auto-complete panel 502. The auto-complete panel 502 may include a list of auto-complete suggestions for a field based on previous inputs to that field. The auto-complete panel may be a part of any type of application that receives textual input. Typically, auto-complete panels are parts of an application and would be shared even if a user elects to share only the application. Displaying the auto-complete panel 502 may reveal information the user does not want to reveal. In the masked screen image 520, a mask panel 522 is shown in place of the auto-complete panel 502.

Figure 6A:
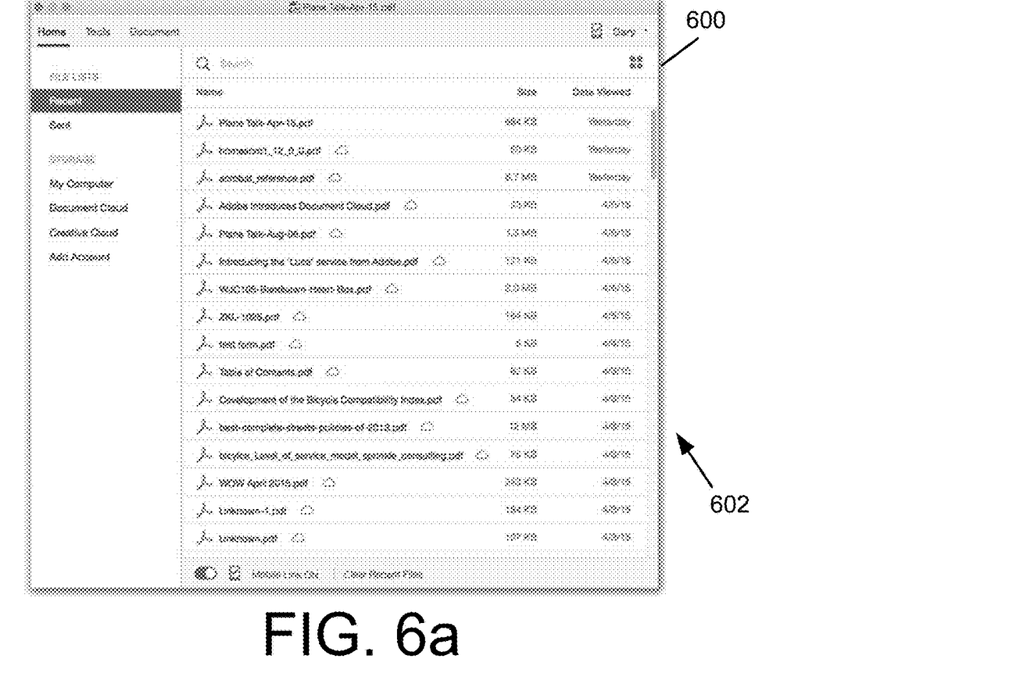
FIG. 6a is a schematic diagram of an example input screen image that includes non-public content.
Figure 6B:
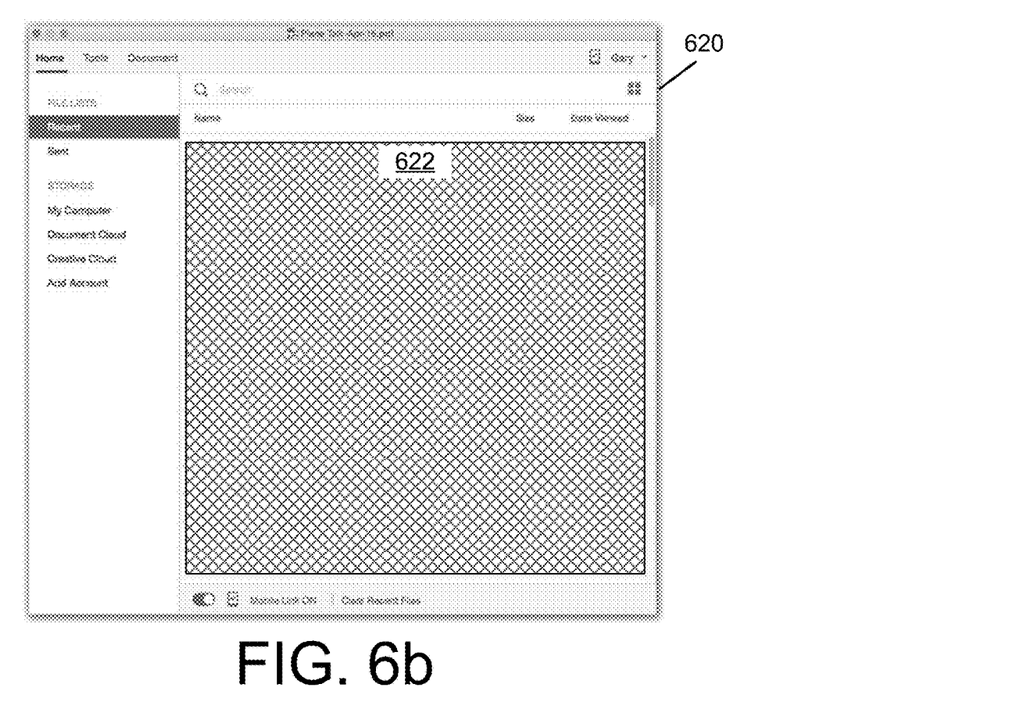

Referring to FIGS. 6a and 6b, an example input screen image 600 and a corresponding masked screen image 620 are shown. The input screen image 600 includes a recently accessed panel 602. The recently accessed panel 602 may include a list of objects (e.g., files) that have been recently accessed. The recently accessed panel 602 may be a part of any type of application that accesses objects. Typically, recently accessed panels are parts of an application and would be shared even if a user elects to share only the application. Displaying the recently accessed panel 602 may reveal information the user does not want to reveal. In the masked screen image 620, a mask panel 622 is shown in place of the recently accessed panel 602.

Figure 7:
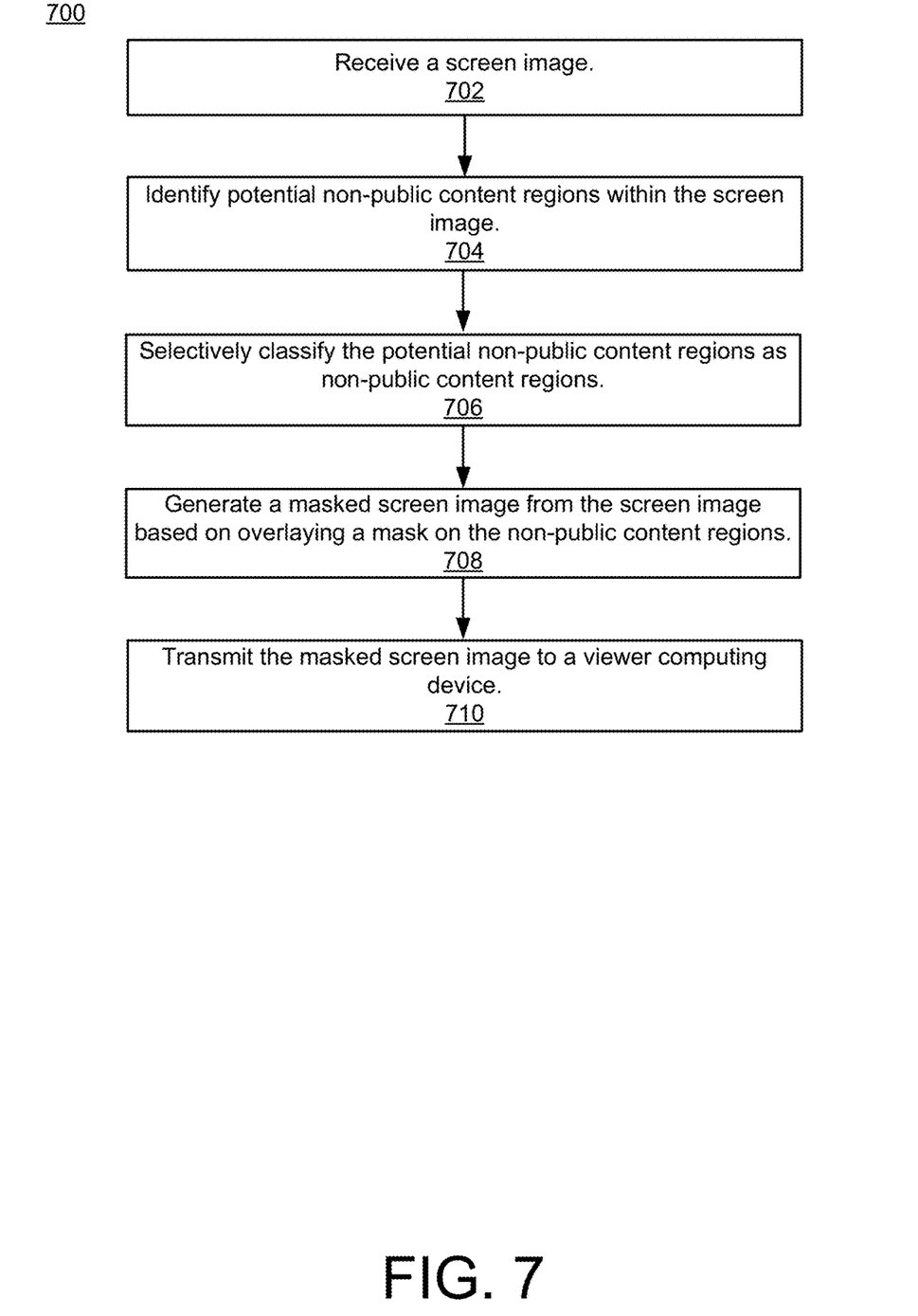
FIG. 7 is an example method of masking non-public content, in accordance with implementations provided herein.

Referring to FIG. 7, a method 700 illustrates example operations of the system 100 of FIG. 1. The method 700 may be used to mask non-public content. The method 700 may be performed, for example, by the content masking system 114.

At operation 702, an input screen image is received. The input screen image may represent some or all of all an image that is generated for display by a computing device. The input screen image may be captured from a framebuffer in memory that is used to drive a display device.

At operation 704, potential non-public content regions within the input screen image are identified. The potential non-public content regions may be identified by the region-based object detection system 116. Any number of potential non-public content regions can be identified. For example, some images may result in no potential non-public content regions being identified, while other images may result in thousands of potential non-public content regions being identified. In some implementations, the potential non-public content regions have rectangular or other shapes. The potential non-public content regions may be identified based on properties of the images, such as identified borders, which may, for example, correspond to borders of user interface elements.

Figure 8:
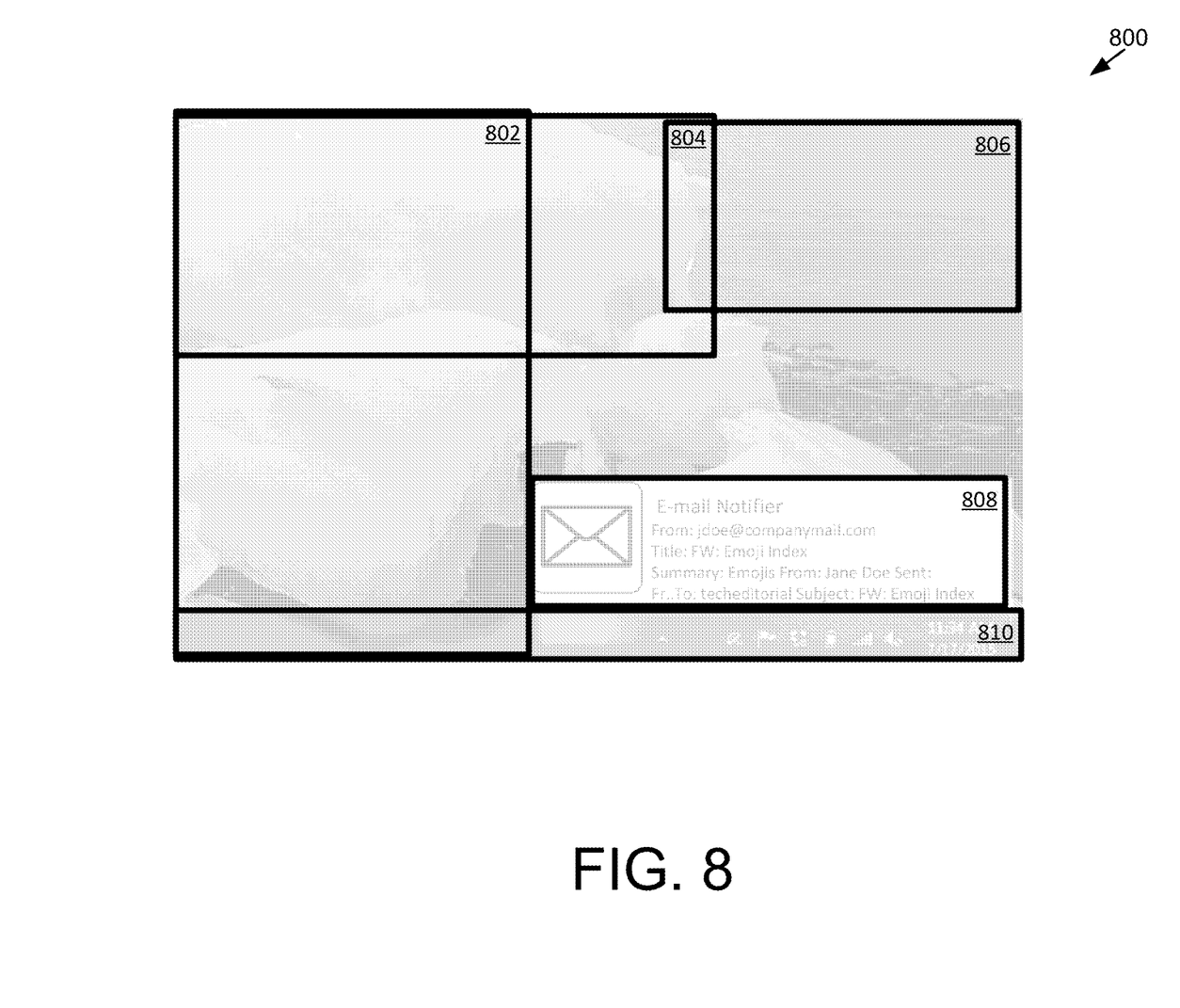
FIG. 8 is a schematic diagram of an example screen image with potential non-public content regions identified.

FIG. 8 shows an example image 800 with several potential non-public content regions 802, 804, 806, 808, and 810 that have been identified. As shown in this example, the potential non-public content regions may overlap. In this example, the potential non-public content regions are rectangular, but other shapes are possible too.

Returning now to FIG. 7, in some implementations, the region-based object detection system 116 also extracts features from the potential non-public regions. The features may be extracted from the image data corresponding to the regions. The region-based object detection system 116 may use the extracted features to generate output parameters corresponding to the regions. The output parameters may include labels and/or scores that are assigned to the regions based on the image content of the regions, the extracted features, and/or the locations of the regions.

At operation 706, the potential non-public content regions are selectively classified as non-public content regions. For example, the classifier 118 may selectively classify each of the potential non-public content regions identified by the region-based object detection system 116 based on features of the region that were extracted by the region-based object detection system 116 and/or output parameters generated by the region-based object detection system 116.

At operation 708, a masked screen image is generated from the input screen image based on overlaying a content mask on the non-public content regions. For example, the image masking engine 120 may generate masks for each of the regions classified as non-public content regions in operation 706. As described previously, the mask may be an opaque graphic element that completely occludes the corresponding non-public content region. The mask may also be a partially translucent graphic element that blurs or otherwise obscures the non-public content.

At operation 710, the masked screen image is transmitted to a viewer computing device. For example, the masked screen image may be transmitted over a network to one or more viewers of an online meeting in which a screen is being shared. Because the non-public content regions in the images are masked, the information in the identified non-public content regions is not inadvertently revealed to viewers of the online meeting.

The method 700 may be performed by the computing device that captures the input screen image. Additionally, the method 700 may be performed by a server that receives the input screen image from a computing device that captured it. For example, an online meeting service may receive a sequence of input screen images from a participant in the online meeting who is sharing a screen. The online meeting service may perform the method 700 on some or all of the received input screen images to mask non-public content and then transmit the masked screen images to the other participants in the online meeting.

Figure 9:
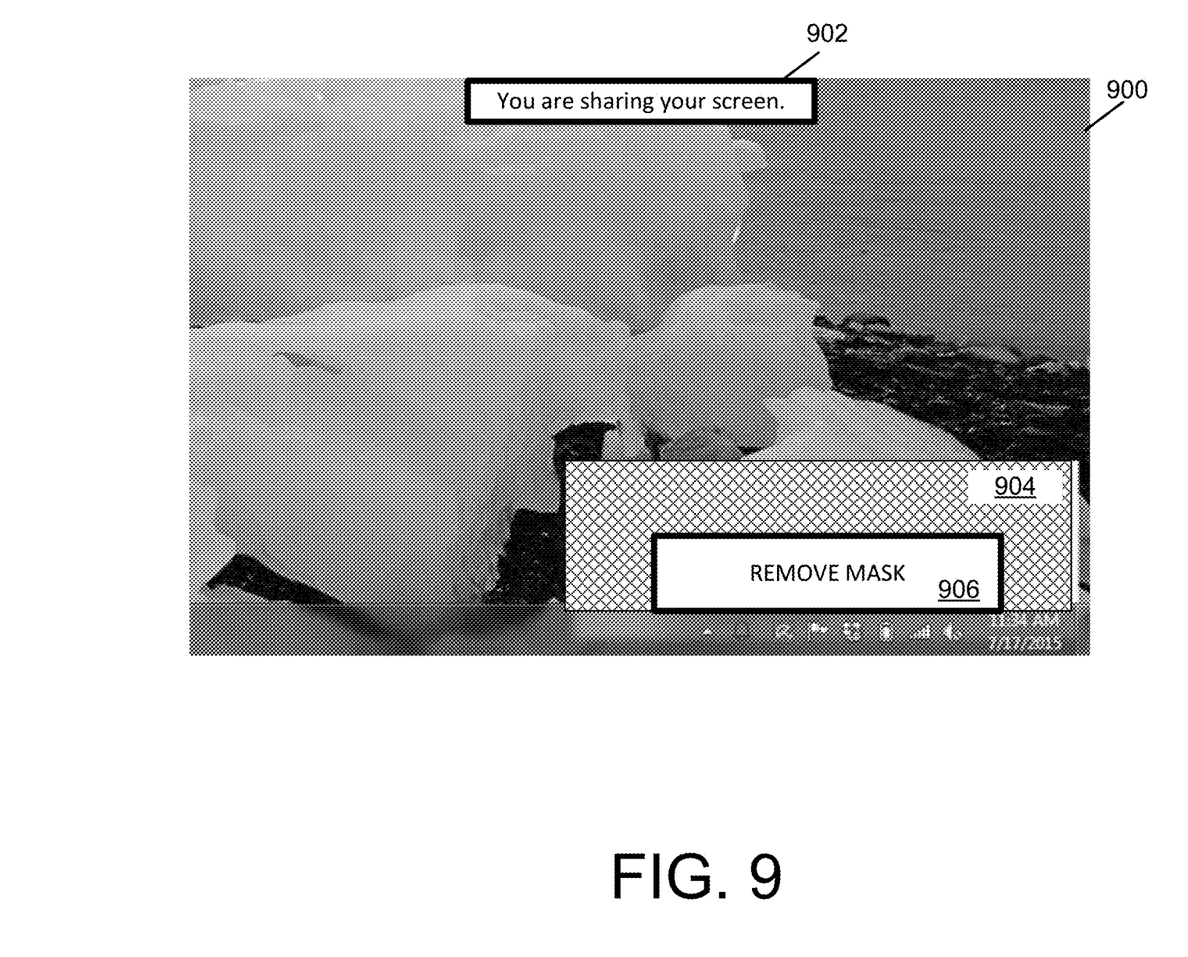
FIG. 9 is a schematic diagram of an example user interface screen, in accordance with implementations provided herein.

In some implementations, mask data is used to present a user interface on the computing device in which the input screen images is being captured (e.g., the presenter user's computing device) to show the regions that are being masked. The user interface may be configured to receive inputs to remove certain masks from some or all of the regions. FIG. 9 shows an example user interface screen 900 that may be generated by implementations of the user interface 124. In this example, the user interface screen 900 shows an input image in the background with a sharing indicator 902, a mask panel 904, and a user-actuatable mask feedback element 906. The sharing indicator 902 may be displayed to alert or remind a user that the screen is being shared. The mask panel 904 may be overlaid on an identified non-public content region. The mask panel 904 is an example of a mask user interface element. The mask feedback element 906 can be used to remove the mask panel 904 from the corresponding reason and/or to provide feedback to the content masking system 114. For example, if the mask feedback element 906 is actuated the current image may be used by the content masking system training engine 128 to re-train the region-based object detection system 116 or the classifier 118. In this manner, the system 100 may receive user feedback regarding the masked images.

Returning now to FIG. 7, in some implementations, a method similar to the method 700 is used to mask non-public information in screen capture videos to mask non-public content in the screen capture videos. The masking may be performed as the screen capture video is captured or as a post processing step.

Figure 10:
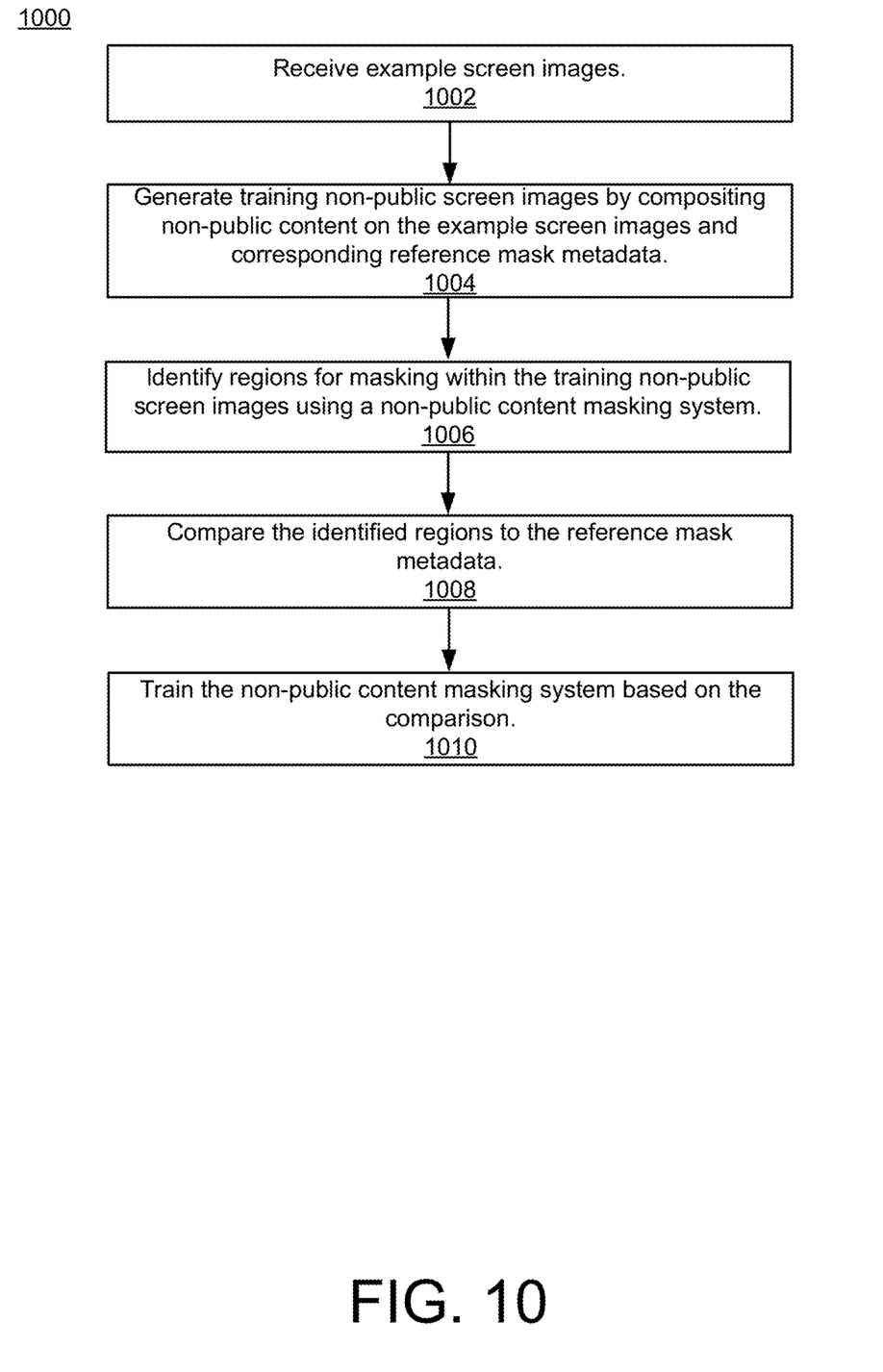
FIG. 10 is an example method of training a non-public content masking system, in accordance with implementations provided herein.

Referring to FIG. 10, a method 1000 illustrates example operations of the system 100 of FIG. 1. The method 1000 may be used to train the content masking system to identify non-public content regions in an input screen image. The method 1000 may be performed, for example, by the content masking system training engine 128.

At operation 1002, a plurality of example screen images is received. These images may be received from a local data store and/or from an image database stored in the cloud. The example screen images may include training public screen images (e.g., screen images that are free of non-public content). The example screen images may also, for example, include background images that are commonly used on screens (e.g., common desktop images).

At operation 1004, training non-public screen images and corresponding metadata are generated based on compositing non-public content on the example screen images. In some implementations, the non-public content includes images of non-public content. The non-public content may be generated by adding text to template images. The non-public content may be composited over the example screen images in various positions. Reference mask metadata is also generated for the training non-public screen images. The reference mask metadata identifies the locations of the non-public content in the training non-public screen images. For example, the reference mask metadata may include coordinates and/or sizes of the regions that should be masked in each of the training non-public content screen images.

At operation 1006, regions for masking within the training non-public screen images are identified using a non-public content masking system. For example, a process similar to that described in operations 704 and 706 of the method 700 may be applied to the training non-public screen images to identify regions for masking within the training non-public content images. The identified regions may be used to generate generating training masks based on the identified regions. In some implementations, example training public screen images (i.e., screen images that do not include non-public content) are also evaluated with the non-public content masking system.

At operation 1008, the identified regions are compared to the reference mask metadata to identify errors. Various types of errors may occur such as failing to identify a non-public content region for masking, misaligning a mask region to the non-public content region, or incorrectly identifying a region for masking that does not include non-public content. In some implementations, various types of loss functions may be calculated based on the comparisons.

At operation 1010, the content masking system 114 may be adjusted based on the comparisons of the identified regions to the reference mask metadata. These adjustments may be based on the loss functions determined from comparing the identified regions to the reference mask metadata. For example, errors determined using the loss functions may reduce the loss in the region-based object detection system 116 in future iterations. The classifier 118 may also be adjusted based on the comparisons to improve the functioning of the classifier 118 during future iterations.

The method 1000 may be repeated any number of times using different example screen images, non-public content, or compositing positions. For example, the method 1000 may be performed 100 times (i.e., for 100 epochs) to train the content masking system 114. The training method used to optimize the content masking system 114 may include gradient descent, Adam optimization, and the like.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for masking screen images, the system comprising:
    at least one memory including instructions; and
    at least one processor that is operably coupled to the at least one memory and that is arranged and configured to execute instructions that, when executed, cause the at least one processor to implement an application, the application comprising:
        a screen capture tool configured to generate a screen image representing a screen being displayed by the system;
        a region-based object detection system including a neural network that is trained and configured to identify multiple regions within the screen image as potential non-public content regions;
        a classifier configured to selectively classify the identified regions as non-public content regions; and
        an image masking engine configured to generate a masked image by masking the regions classified as non-public content regions in the screen image.

2. The system of claim 1, further comprising a user interface configured to overlay mask user interface elements on the screen being displayed by the system, the mask user interface elements indicating the regions classified as non-public content regions.

3. The system of claim 2, wherein the user interface is further configured to receive a user input via a mask user interface element indicating an associated region should not be masked.

4. The system of claim 3, wherein the user interface is further configured to:
    responsive to receiving the user input via the mask user interface element:
        generate user feedback indicating that the region of the screen image associated with the mask user interface element does not include non-public content; and
        transmit the screen image to a content masking system training engine.

5. The system of claim 1, wherein the neural network comprises a faster regional convolution neural network.

6. The system of claim 1, wherein the classifier comprises a support vector machine.

7. The system of claim 1, wherein:
    the screen capture tool is configured to generate key frame screen images and inter frame screen images, the inter frame screen images being expressed in terms of an associated key frame screen image; and
    the image masking engine is configured to generate a masked image for an inter frame screen image based on masking the regions classified as non-public content regions in the associated key frame screen image.

8. A computer-implemented method for masking a screen image, the method comprising:
    receiving a screen image representing a screen being displayed by a sharing computing device;
    identifying potential non-public content regions within the screen image using a neural network that is trained to identify non-public content regions within the screen image;
    selectively classifying the potential non-public content regions as non-public content regions;
    generating a masked screen image from the screen image based on overlaying a mask on the non-public content regions; and
    transmitting the masked screen image to a viewer computing device.

9. The method of claim 8, wherein the neural network comprises a faster regional convolution neural network to identify regions within the screen image.

10. The method of claim 8, further comprising extracting features from the screen image for each of the potential non-public content regions and wherein selectively classifying the potential non-public content regions as non-public content regions comprises using a support vector machine to classify the non-public content regions based on the extracted features.

11. The method of claim 8, further comprising:
    transmitting mask data to the sharing computing device; and
    receiving user feedback indicating to remove a mask from a region.

12. A computer-implemented method for training a system to generate masks for non-public information, the method comprising:
    receiving example screen images;
    compositing non-public content on the example screen images to generate training non-public screen images and corresponding reference mask data;
    identifying regions for masking within the training non-public screen images using a neural network; and
    based on comparisons of the identified regions to the reference mask data, training the neural network to identify regions containing non-public content for input images.

13. The method of claim 12, wherein identifying regions containing non-public content includes identifying regions within an input image using the neural network.

14. The method of claim 13, wherein identifying regions containing non-public content further includes generating output parameters for the identified regions using the neural network.

15. The method of claim 14, wherein the output parameters include labels.

16. The method of claim 13, wherein identifying regions containing non-public content includes selectively classifying identified regions as non-public content regions.

17. The method of claim 16, wherein selectively classifying identified regions as non-public content regions includes classifying the identified regions using a support vector machine.

18. The method of claim 12, wherein the neural network comprises a faster regional convolutional neural network.

19. The method of claim 12, further comprising:

generating training public screen images from the screen images and corresponding reference mask data;

identifying regions for masking within the training public screen images using the neural network;

generating training masks based on the identified regions; and based on comparisons of the training masks to the reference mask data, updating the training of the neural network.

20. The method of claim 19, further comprising:

receiving a user feedback associated with a previous input image, indicating that a region of the previous input image identified for masking does not include non-public content;

adding the previous input image as a training public screen image; and updating the training of the neural network based on the training public screen images.

* * * * *